(12) United States Patent
Fitt

(10) Patent No.: US 9,128,955 B2
(45) Date of Patent: Sep. 8, 2015

(54) SYSTEM AND METHOD FOR A SPATIAL INDEX

(75) Inventor: Andrew J Fitt, Cambridge (GB)

(73) Assignee: Siemens Product Lifestyle Management Software Inc., Plano, TX (US)

(*) Notice: Subject to any disclaimer, the term of this patent is extended or adjusted under 35 U.S.C. 154(b) by 1997 days.

(21) Appl. No.: 12/201,802

(22) Filed: Aug. 29, 2008

(65) Prior Publication Data
US 2010/0057407 A1   Mar. 4, 2010

(51) Int. Cl.
G06F 7/00 (2006.01)
G06F 17/30 (2006.01)

(52) U.S. Cl.
CPC ................ G06F 17/30241 (2013.01)

(58) Field of Classification Search
USPC .................................................. 707/743
See application file for complete search history.

(56) References Cited

U.S. PATENT DOCUMENTS

| | | | | |
|---|---|---|---|---|
| 5,251,290 A | * | 10/1993 | Pabon | 345/420 |
| 6,701,307 B2 | * | 3/2004 | Himmelstein et al. | 707/743 |
| 7,266,545 B2 | * | 9/2007 | Bergman et al. | 707/706 |
| 7,383,275 B2 | * | 6/2008 | Chen et al. | 707/743 |
| 7,689,621 B1 | * | 3/2010 | Huber et al. | 707/743 |
| 2007/0016600 A1 | * | 1/2007 | Bae et al. | 707/101 |

* cited by examiner

Primary Examiner — Alex Gofman
Assistant Examiner — Muluemebet Gurmu

(57) ABSTRACT

A system, method, and computer program for creating an index structure for spatial data, comprising representing a product structure by a network of nodes and edges; setting a local geometric bound for each of said network nodes; propagating a cumulative geometric bound of said local geometric bounds along each of said network edges; and simplifying said cumulative geometric bound at each of said network node during said propagation; whereby a geometric bound of each network node forms a spatial index geometric bound for a matching data model object and appropriate means and computer-readable instructions.

10 Claims, 4 Drawing Sheets

SYSTEM AND METHOD FOR A SPATIAL INDEX

TECHNICAL FIELD

The system of the innovations described herein relate generally to software applications. More specifically, the system relates to digital product management.

BACKGROUND

Computer aided design (CAD) and/or visualization applications use product data management systems for vaulting and configuring products. To perform geometric queries on assemblies and components that make-up the product, it is often desirable or necessary to maintain a geometric index.

SUMMARY

To achieve the foregoing, and in accordance with the purpose of the presently preferred embodiment as broadly described herein, the present application provides a method for creating an index structure for spatial data, comprising representing a product structure by a network of nodes and edges; setting a local geometric bound for each of said network nodes; propagating a cumulative geometric bound of said local geometric bounds along each of said network edges; and simplifying said cumulative geometric bound at each of said network node during said propagation; whereby a geometric bound of each network node forms a spatial index geometric bound for a matching data model object. The method, wherein said product structure is an unconfigured structure. The method, wherein said network is a geometric dependency network. The method, wherein said geometric dependency network models are one of geometric data use and geometric containment.

Another advantage of the presently preferred embodiment is to provide a method for creating an index structure for spatial data, comprising representing an unconfigured structure by a geometric dependency network of nodes and edges; setting a local geometric bound for each of said network node; propagating a cumulative geometric bound along each of said network edge; and simplifying said cumulative geometric bound at each of said network node during propagation; whereby a geometric bound of each of said network node forms a spatial index geometric bound for a matching data model object. The method, wherein said geometric dependency network models are one of geometric data use and geometric containment.

And another advantage of the presently preferred embodiment is to provide a spatial index, comprising a product structure represented by a network of nodes and edges; a local geometric bound set for each of said network nodes; a cumulative geometric bound of said local geometric bound set propagated along each of said network edges; and a match formed between a data model object and said cumulative geometric bound of each of said network nodes. The spatial index, wherein said product structure is unconfigured. The spatial index, wherein said network is a geometric dependency network. The spatial index, wherein said geometric dependency network models are one of geometric data use and geometric containment. The spatial index, wherein said cumulative geometric bound is simplified at each network node during propagation.

Yet Another advantage of the presently preferred embodiment is to provide a system for creating an index structure for spatial data, comprising a computer system, wherein said computer system includes a memory, a processor, a user input device, and a display device; a computer displayed hierarchical list for a product structure; and wherein a user uses the computer system and the computer system represents an unconfigured structure by a geometric dependency network of nodes and edges; sets a local geometric bound for each of said network node; propagates a cumulative geometric bound along each of said network edge; and simplifies said cumulative geometric bound at each of said network nodes during said propagation; whereby a geometric bound of each of said network nodes forms a spatial index geometric bound for a matching data model object. The system, wherein said geometric dependency network models are one of geometric data use and geometric containment.

Still another advantage of the presently preferred embodiment is to provide a system for data management, comprising a geometric model having a plurality of geometric model objects; a list of data model objects corresponding to said geometric model to define a product structure; and a geometric spatial index that supports geometric queries on said list of data model parts in a time-efficient manner. The system, further comprising said geometric model represented by a geometric dependency network of nodes and edges. The system, wherein said geometric dependency network models are one of geometric data use and geometric containment.

And yet another advantage of the presently preferred embodiment is to provide a data processing system having at least a processor and accessible memory to implement a method for creating an index structure for spatial data, comprising means for representing an unconfigured structure by a geometric dependency network of nodes and edges; means for setting a local geometric bound for each of said network node; means for propagating a cumulative geometric bound along each of said network edge; means for simplifying said cumulative geometric bound at each of said network nodes during propagation; and means for forming a spatial index geometric bound for a matching data model object from a geometric bound of each of said network nodes.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

1. Computer System

Figure 4:
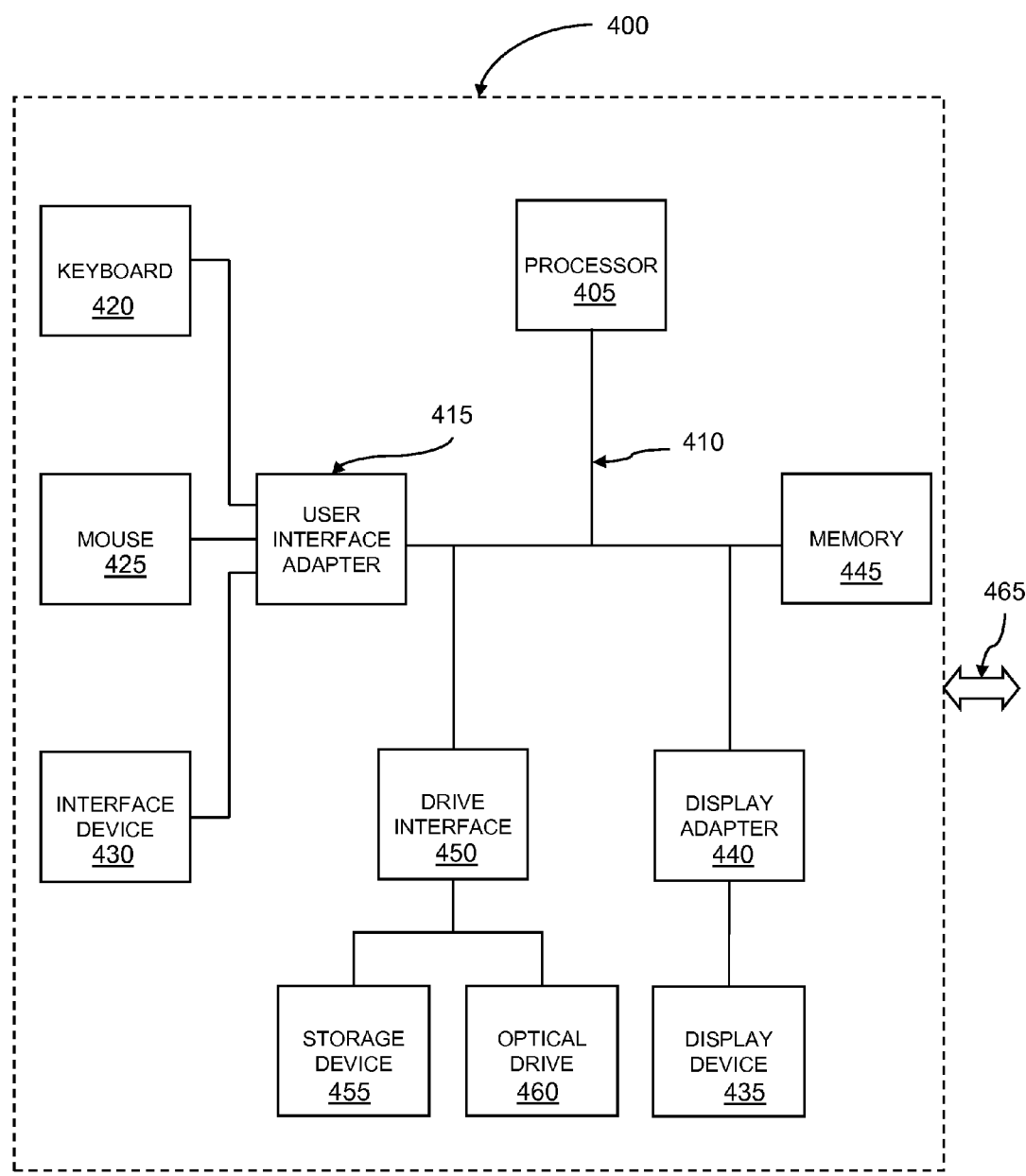
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides a few examples of the many advantageous uses of the innovative teachings herein. The presently preferred embodiment provides, among other things, a system and method for creating a spatial index for geometric queries. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

2. Geometric Index Method

Figure 1:
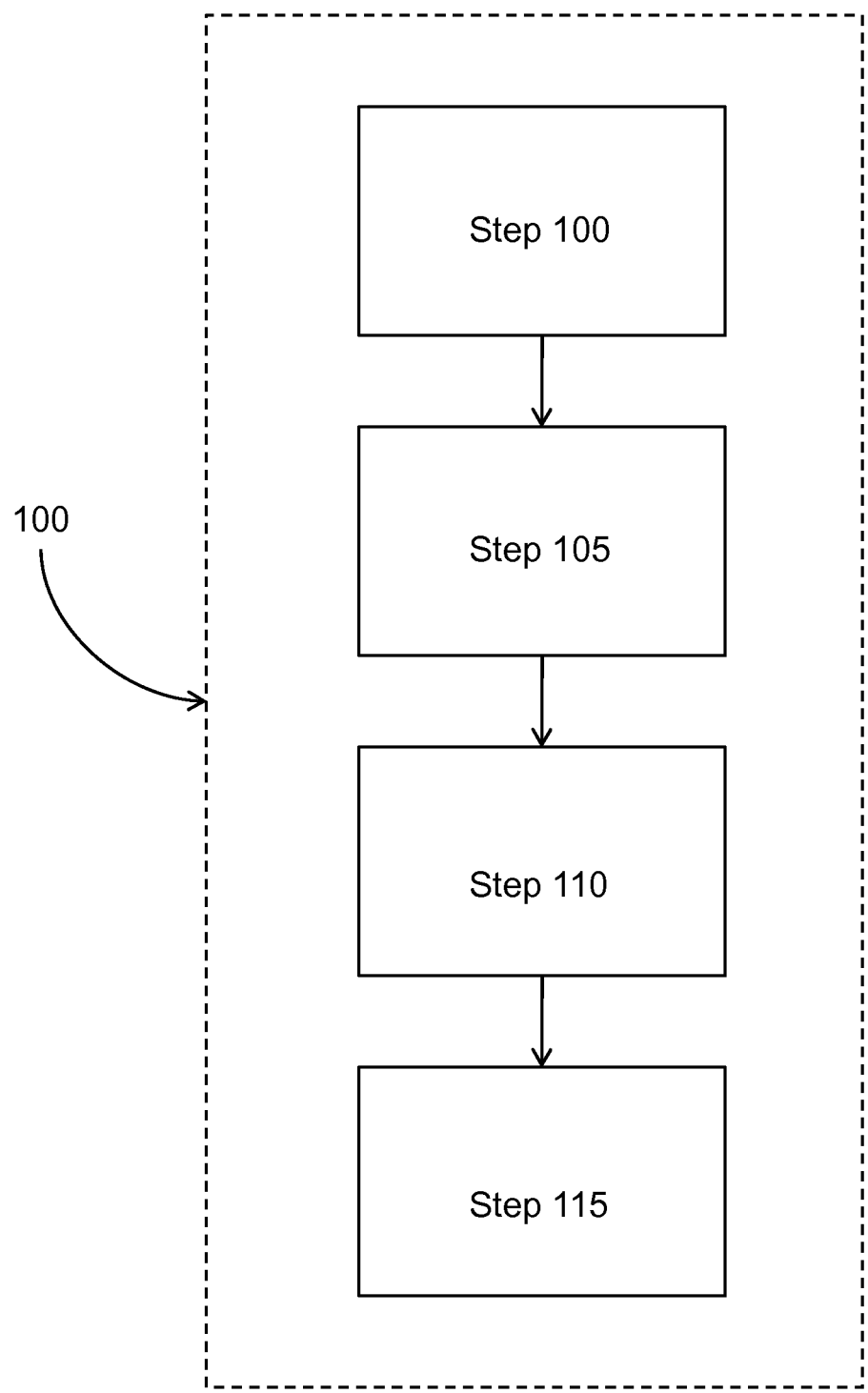
FIG. 1 is a logic flow diagram of the method employed by the presently preferred embodiment.

FIG. 1 is a logic flow diagram of the method employed by the presently preferred embodiment. Referring to FIG. 1, the presently preferred embodiment discloses a method 100 for creating an index structure that represents a product structure by a network of nodes and edges at Step 100. The method next sets a local geometric bound for each of the network nodes at Step 105. The method next propagates a cumulative geometric bound of the local geometric bounds along each of the network edges at Step 110. And the method then simplifies the cumulative geometric bounds at each of the network nodes during propagation at Step 115. The method described creates a spatial index for geometric queries that may be used to search any constructible bill of material (BOM) tree that can be rooted in any assembly, and constructed using any configuration rule without undue experimentation by those having ordinary skill in the art. A persisted geometric index of a persisted data model may also be employed where it is possible to omit some of the network nodes from the persisted index.

3. Geometric Index Structure

The index structure disclosed below uses one-dimensional bounds for illustrative purpose, however, one skilled in the art and without undue experimentation could apply the below equally to two-, three-, and other dimensional bounds. Table 1 contains sample data for unconfigured product structure:

TABLE 1

| Assembly Revision | Assembly | | |
|---|---|---|---|
| C1 | C | | |
| D1 | D | | |
| D2 | D | | |
| Part Revision | Part | Geometric Bound | |
| A1 | A | −1 to +1 | |
| B1 | B | −1 to +2 | |
| B2 | B | −1 to +3 | |
| Occurrence | Assembly Revision | Part/Assembly | Transform |
| C1.1 | C1 | A | −2 |
| C1.2 | C1 | B | 0 |
| D1.1 | D1 | C | 0 |
| D1.2 | D1 | B | +3 |
| D2.1 | D2 | C | 0 |
| D2.2 | D2 | B | +4 | a. Geometric Dependency Network

Figure 2:
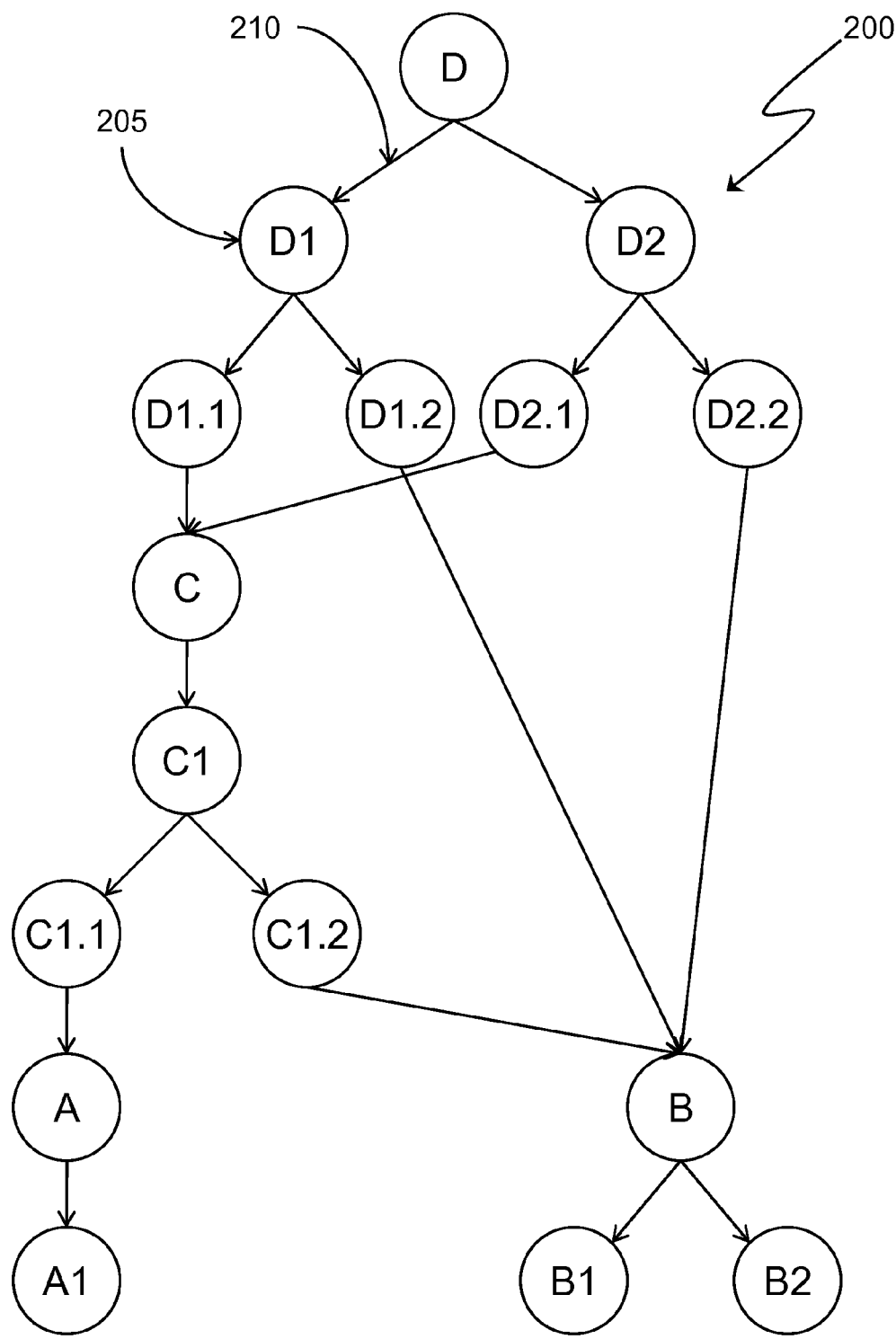
FIG. 2 is a sample geometric dependency network illustrating nodes and dependencies.

FIG. 2 is a sample geometric dependency network illustrating nodes and dependencies. Referring to further to FIG.

2, a geometric dependency network, generally illustrated at 200, represents a network of nodes and edges from the sample data provided in Table 1, where it is also known that the geometric dependency network 200 models not only geometric data use but also geometric containment. A node 205 in the geometric dependency network 200 represents an object (not depicted) for which its geometric bounds can be calculated. Each object is part of a data model to index. For example, geometric bounds may be calculated for part revisions, for transformed occurrences of a part, for assembly revisions, and for assemblies. Geometric bounds may also be calculated for geometric overrides, and structure overrides to a geometric structure. Further, each directed edge 210 in the geometric dependency network 200 represents a dependency of the geometric bound of one node on the geometric bound of another node. Dependencies may come from different sources, for example conditional selection of one object by another. An example of conditional selection occurs when the geometric bound of an unconfigured part depends on the geometric bound of each part revision that can be selected to configured for that part. Other dependencies may include containment of one object by another object where the geometric bound of an assembly revision depends on the geometric bound of each part occurrence that the assembly revision contains. And yet another dependency may include transformation of one object by another where the geometric bound of a part occurrence depends on the transformed geometric bound of the part it contains so that the assembly transform of the occurrence is used in the transformation. Other dependencies are also contemplated to exist within the scope of the presently preferred embodiment that includes dependencies discovered through the combination of familiar elements according to known methods. Override objects are represented by network nodes. When an override object uses a non-overridden value from a part or assembly object, the override node depends on the value node, and the dependency becomes a network edge. When an assembly can be configured to contain an override, the assembly node depends on the override node, and the dependency becomes a network edge.

b. Local Geometric Bounds

Some objects in the data model will have known geometric bounds, such as individual part revisions, or the overridden part geometry of an individual occurrence, for example, a spring under compression. Known object geometric bounds may be attached to the corresponding geometric dependency nodes 205 to form a set of geometric bounds. This set is the local geometric bounds of the node—the bounds of geometric data local to that object. Sample data from Table Scan have the local geometric bounds shown here in Table 2:

TABLE 2

| Node | Local Bounds |
|---|---|
| Node-A1 | −1 to +1 |
| Node-B1 | −1 to +2 |
| Node-B2 | −1 to +3 | c. Cumulative Geometric Bounds

Calculate the cumulative geometric bound for each node by first forming the set of adjacent geometric nodes on which the current node depends. Next form the set of geometric bounds from the cumulative geometric bound of each of these adjacent nodes and the set of local geometric bounds of the current node (found in 3.b, above). And then simplify the set of geometric bounds to form the single, cumulative geometric bound for the current node. Propagating a geometric bound along some edges may involve a transformation. The index geometric bound of any data model object is preferably the cumulative geometric bound of the matching network node. The sample data shown in Tables 1 & 2 has the following cumulative geometric bounds, as shown in Table 3:

TABLE 3

| Node | Cumulative Bound |
|---|---|
| Node-A1 | −1 to +1 |
| Node-A | −1 to +1 |
| Node-B1 | −1 to +2 |
| Node-B2 | −1 to +3 |
| Node-B | −1 to +3 |
| Node-C1.1 | −3 to −1 |
| Node-C1.2 | −1 to +3 |
| Node-C1 | −3 to +3 |
| Node-C | −3 to +3 |
| Node-D1.1 | −3 to +3 |
| Node-D1.2 | +2 to +6 |
| Node-D1 | −3 to +6 |
| Node-D2.1 | −3 to +3 |
| Node-D2.2 | +3 to +7 |
| Node-D2 | −3 to +7 |
| Node-D | −3 to +7 |

As illustrated, the geometric bounds are transformed along the part-occurrence edges as the cumulative geometric bounds are transformed from part space to occurrence space. For example, Node-C1.1 has the transformed bound of Node-A.

The propagation rule defines the cumulative geometric bound of each node, except where a node is part of one or more network cycles. Alternatively, it is still possible to construct an index when the network model contains cycles, by setting the cumulative geometric bound for each node in a cycle to the infinite bound. And solving the cycle simultaneously to find the cumulative geometric bound of each node, where the solution may have finite bounds depending on the group structure. Then, forming the geometric bound of each node in the broken cycle using the normal rules, using application-specific knowledge of cycle validity and cycle breaking to break each cycle.

d. Geometric Bound Simplification

Any form of geometric bound may be used to build the index. This may include, but is not limited to: a single axis-aligned bounding box (in the object-local co-ordinate frame); a set of axis-aligned bounding boxes, where the geometric union of the boxes forms the bound; and a set of axis-aligned bounding boxes formed into an r-tree, where the geometric union of the boxes forms the bound; and bounding triangular facets.

In 3.c, a set of geometric bounds were simplified into a single geometric bound. Such simplification servers to reduce storage size of the spatial index, reduce the complexity of the geometric bound for each node; and reduce the number of spatial index bounds that must be updated when nodes or edges are either added or removed. Simplification is effective for product structures because part revisions are form, fit and function compatible. The geometric bound of a part is similar to the geometric bound of each part revision. The geometric bound of any new part revision will be similar to the existing geometric bound of the part. Further, simplifications are effective for part structures because part assembly revisions tend to contain parts or assemblies which are transformed to be spatially adjacent. Part assembly revisions are themselves form, fit and function compatible. Returning to the sample data, the unsimplified bound of B is the set of bounds [B1, B2] or [(−1 to +2), (−1 to +3)]. This can be simplified to the single bound (−1 to +3) which contains both the bounding interval of B1 and B2. Simplification of a set of bounding intervals into one bounding interval is just one example of a simplification rule. Simplification rules may include, but are not limited to simplifying a set of axis-aligned bounding boxes to a single axis-aligned bounding box and simplifying a set of axis-aligned bounding boxes to a small (bounded) set of axis-aligned bounding boxes. The later simplification rule preferably avoids combining two intervals when there is a significant gap between them. This combination trades data storage and test time for a more accurate bound.

e. Concurrency.

The spatial index can be kept consistent in an environment with multiple execution processes or threads, providing a suitable concurrency strategy is in place. One suitable locking strategy for changing the index is to write-lock every node changed; write-lock every node which (directly) depends on a changed edge; and read-lock every unlocked node on which a changed node depends. Where two different processes simultaneously have a sub-network locked, there are no data changes that can propagate from one sub-network into the other.

4. Properties of the Spatial Index

The disclosed spatial index has properties that are useful in a range of geometric search algorithms. The spatial index also has compact storage and time-complexity guarantees that make index construction and maintenance affordable.

a. Index Bound

In a configured bill of material (BOM) tree, where it is known that a BOM tree may alternatively be a bill of processes, or bill of manufacturing, or other similar list of data model objects used to define and understand a similar structure, the geometric bound of an individual BOM line is itself bounded by the set of index bounds for the data model objects that make up the BOM line. Because the data model objects may change and become more precise when the BOM line is configured, the spatial index bound also changes and becomes more precise as the BOM line is configured. This configured index bound is itself bounded by the unconfigured index bound.

Figure 3:
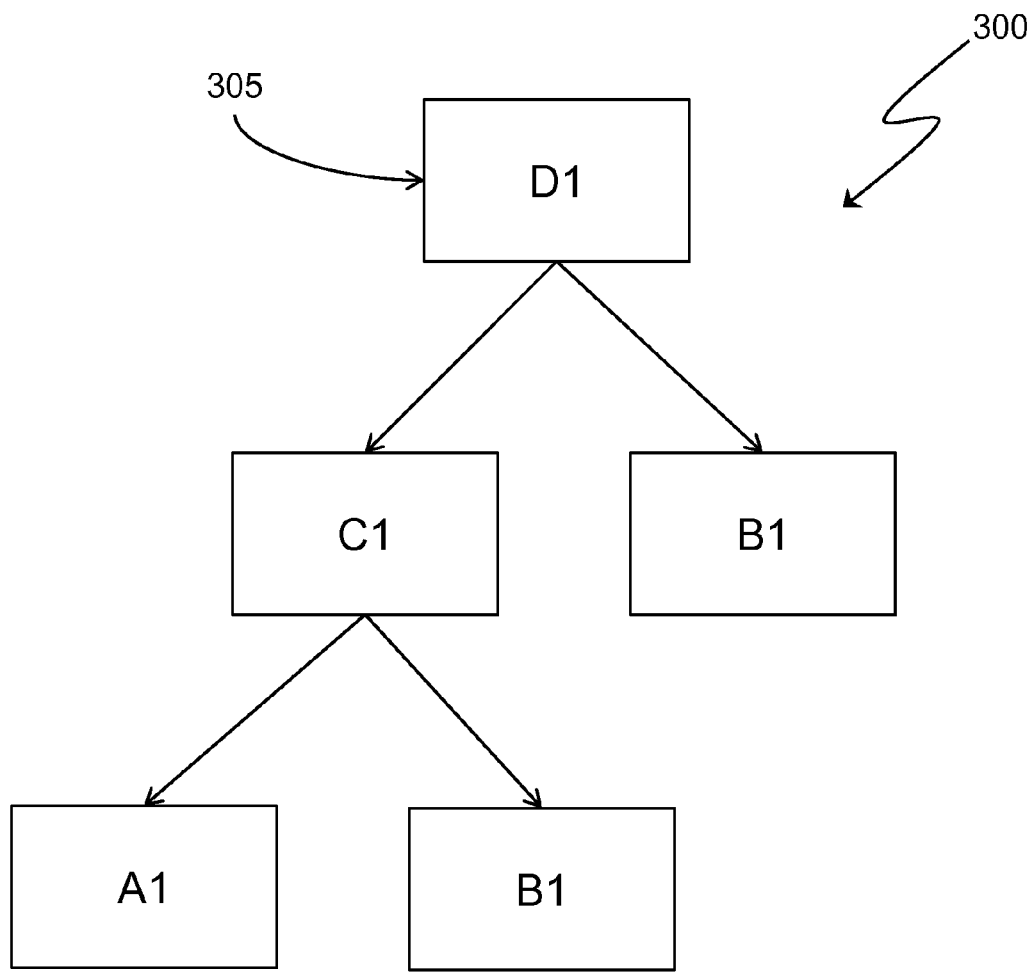
FIG. 3 illustrates a bill of material tree.

FIG. 3 illustrates a bill of material tree. Referring further to FIG. 3, a BOM tree, generally illustrated at 300, has a number of data model objects 305 with the following information, illustrated in Table 4:

TABLE 4

| BOM line | Transform to Root |
| --- | --- |
| D1 | 0 |
| D1.1-C1 | 0 |
| D1.1-C1.1-A1 | −2 |
| D1.1-C1.2-B1 | 0 |
| D1.2-B1 | +3 |

Combining the sample data in Table 4, with that of Tables 1-3, Table 5 shows the following bounds:

| BOM line | Actual Bound | Configured Index Bound | Unconfigured Index Bound |
| --- | --- | --- | --- |
| D1 | −3 to +5 | −3 to +6 | −3 to +7 |
| D1.1-C1 | −3 to +2 | −3 to +3 | −3 to +3 |
| D1.1-C1.1-A1 | −3 to −1 | −3 to −1 | −3 to −1 |
| D1.1-C1.2-B1 | −1 to +2 | −1 to +2 | −1 to +3 |
| D1.2-B1 | +2 to +5 | +2 to +5 | +2 to +6 |

For each BOM line the actual bound is bounded by the configured index bound, which in turn is bounded by the unconfigured index bound, as seen in BOM line D1, for example.

b. Complexities

The storage required by the index is prefarbly:

$$bytes_{total} = n_{obj} \cdot bytes_{simplified}$$

where $bytes_{total}$ is the storage required, $n_{obj}$ is the number of data model objects that have (directly or indirectly) geometric bounds and $bytes_{simplified}$ is the (average) number of bytes required to store a simplified bound. The total storage for the index is also bounded, no matter how complex the network where the size of the simplified bound is bounded by the simplification rule, see 3.d, supra.

The time complexity for updating the index on a geometric or network change is preferably bounded by:

$$t_{update} = k_1 \cdot n_{depnodes} \cdot t_{simplification} + k_2 \cdot n_{depedges}$$

where $t_{update}$ is the time to update the index, $k_1$ is a constant, $n_{depnodes}$ is the number of network nodes that depend on the change, $t_{simplification}$ is the time to simplify the bounds, $k_2$ is a constant, $n_{depedges}$ is the number of network edges that depend on the change, and $t_{simplification}$ depends both on the choice of simplification rule, and the number of dependent edges at a given node. The updated geometric bound for a node (especially when the node is several edges removed from the initial update) may be identical to the original geometric bound after simplification for the reasons discussed in 3.d, supra. This allows update to terminate more quickly, and reduces the impact of updates to frequently-used parts and assemblies.

5. Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include numerous forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment, such as where configurable and/or exploded structures are used in problem domains other than the product structure. For example manufacturing assemblies and manufacturing processes can be both versioned (then configured) and exploded. Further, the presently preferred embodiment is not limited to geometric data. Any data that can be bounded can be indexed in using the method and system as disclosed and contemplated. For example, part/assembly mass can be bounded by a single positive number, and is contained by addition (rather than geometric union) and is conditionally selected by a maximum (rather than geometric union). If a mass index is constructed, it enables queries such as—which assemblies weigh at least 5 kg. Therefore, other implementations are within the scope of the following claims that include discoveries through the combination of familiar elements according to known methods.

What is claimed is:

1. A method, comprising:
representing a product structure by a network of nodes and edges by a server computer system, each node representing a corresponding data model object;
setting a local geometric bound for each of said network nodes by the server computer system;
propagating a cumulative geometric bound of said local geometric bounds along each of said network edges by the server computer system; and
simplifying said cumulative geometric bound at each of said network nodes during said propagation by the server computer system, wherein the cumulative geometric bound defines a spatial index geometric bound for the corresponding data model object;
creating an index structure, by the server computer system, according to the data model objects and the cumulative geometric bounds; and
performing a geometric query on the index structure by the server computer system to identify geometric bounds of data model objects.

2. The method of claim 1, wherein said product structure is an unconfigured structure.

3. The method of claim 1, wherein said network is a geometric dependency network.

4. The method of claim 3, wherein said geometric dependency network models are one of a geometric data use and a geometric containment.

5. A method, comprising:
representing an unconfigured structure by a geometric dependency network of nodes and edges by a server computer system, each node representing a corresponding data model object;
setting a local geometric bound for each of said network node by the server computer system;
propagating a cumulative geometric bound along each of said network edge by the server computer system; and
simplifying said cumulative geometric bound at each of said network node during propagation by the server computer system, wherein the cumulative geometric bound defines a spatial index geometric bound for the corresponding data model object;
creating an index structure, by the server computer system, according to the data model objects and the cumulative geometric bounds; and
performing a geometric query on the index structure by the server computer system to identify geometric bounds of data model objects.

6. The method of claim 5, wherein said geometric dependency network models are one of a geometric data use and a geometric containment.

7. A computer system for creating an index structure for spatial data, comprising:
a memory, a processor, a user input device, and a display device;
wherein the computer system is configured to represent an unconfigured structure by a geometric dependency network of nodes and edges;
set a local geometric bound for each of said network node;
propagate a cumulative geometric bound along each of said network edge; and
simplify said cumulative geometric bound at each of said network nodes during said propagation, wherein the cumulative geometric bound defines a spatial index geometric bound for a corresponding data model object;
create an index structure according to the data model objects and the cumulative geometric bounds; and
perform a geometric query on the index structure to identify geometric bounds of data model objects.

8. The system of claim 7, wherein said geometric dependency network models are one of a geometric data use and a geometric containment.

9. A data processing system comprising:
a processor; and
an accessible memory, the data processing system configured to implement a method for creating an index structure for spatial data by
representing an unconfigured structure by a geometric dependency network of nodes and edges;
setting a local geometric bound for each of said network node;
propagating a cumulative geometric bound along each of said network edge;
simplifying said cumulative geometric bound at each of said network nodes during propagation;
forming a spatial index geometric bound for a matching data model object from a geometric bound of each of said network nodes;
creating an index structure for a plurality of data model objects each represented by the nodes according to the respective cumulative geometric bounds; and
performing a geometric query on the index structure by the server computer system to identify geometric bounds of data model objects.

10. A non-transitory machine-readable storage medium encoded with executable instructions that, when executed, can cause a processor to:
represent an unconfigured structure by a geometric dependency network of nodes and edges;
set a local geometric bound for each of said network node;
propagate a cumulative geometric bound along each of said network edge; and
simplify said cumulative geometric bound at each of said network nodes during said propagation, wherein the cumulative geometric bound defines a spatial index geometric bound for a corresponding data model object;
create and index structure according to the data model objects and the cumulative geometric bounds; and
perform a geometric query on the index structure to identify geometric bounds of data model objects.

* * * * *